(12) United States Patent
Chen et al.

(10) Patent No.: US 7,140,976 B2
(45) Date of Patent: *Nov. 28, 2006

(54) WEIGHT MEMBER FOR A GOLF CLUB HEAD

(75) Inventors: Chan-Tung Chen, Kaohsiung (TW); Wen-Hung Tseng, Kaohsiung (TW)

(73) Assignee: Fu Sheng Industrial Co., Ltd., Taipei (TW)

( * ) Notice: Subject to any disclaimer, the term of this patent is extended or adjusted under 35 U.S.C. 154(b) by 109 days.

This patent is subject to a terminal disclaimer.

(21) Appl. No.: 10/920,256

(22) Filed: Aug. 18, 2004

(65) Prior Publication Data

US 2005/0049074 A1    Mar. 3, 2005

Related U.S. Application Data

(63) Continuation-in-part of application No. 10/652,233, filed on Sep. 2, 2003.

(51) Int. Cl.
*A63B 53/04* (2006.01)
*A63B 53/06* (2006.01)

(52) U.S. Cl. ........................ 473/334; 473/338; 473/337

(58) Field of Classification Search ......... 473/324–530
See application file for complete search history.

(56) References Cited

U.S. PATENT DOCUMENTS 2,198,981 A * 4/1940 Sullivan ..................... 473/338
4,465,221 A * 8/1984 Schmidt ..................... 228/125
5,385,348 A * 1/1995 Wargo ......................... 473/338
5,421,577 A * 6/1995 Kobayashi .................. 473/335
5,584,770 A * 12/1996 Jensen ........................ 473/350
5,938,540 A * 8/1999 Lu ............................. 473/288
6,093,112 A * 7/2000 Peters et al. ................ 473/291
6,290,607 B1* 9/2001 Gilbert et al. .............. 473/291
6,896,627 B1* 5/2005 Hou ........................... 473/335
6,902,496 B1* 6/2005 Solheim et al. ............. 473/341

FOREIGN PATENT DOCUMENTS

| JP | 10179822 A | * | 7/1998 |
| JP | 10179823 A | * | 7/1998 |
| JP | 10192454 A | * | 7/1998 |
| JP | 2002052100 A | * | 2/2002 |

* cited by examiner

*Primary Examiner*—Eugene Kim
*Assistant Examiner*—Alvin A. Hunter, Jr.
(74) *Attorney, Agent, or Firm*—Birch, Stewart, Kolasch and Birch, LLP (57) ABSTRACT

A golf club head includes a golf club head body and a weight member mounted in a recession of the golf club head body. The weight member includes at least one solder channel for receiving solderable filler. The weight member is mounted in the recession of the golf club head body before a brazing process for bonding the weight member with the golf club head body. During the brazing process, the solderable filler is melted and fills a gap between the weight member and walls delimiting the recession of the golf club head body to thereby increasing bonding strength between the weight member and the walls delimiting the recession of the golf club head body.

13 Claims, 9 Drawing Sheets

WEIGHT MEMBER FOR A GOLF CLUB HEAD

CROSS REFERENCE TO RELATED APPLICATION

This application is a continuation-in-part application of U.S. patent Ser. No. 10/652,233, filed on Sep. 2, 2003.

BACKGROUND OF THE INVENTION

1. Field of the Invention

The present invention relates to a weight member for a golf club head. In particular, the present invention relates to a weight member having at least one engaging surface and at least one solder channel allowing it to be fixed in a recession of a golf club head body by brazing.

2. Description of Related Art

Figure 1:
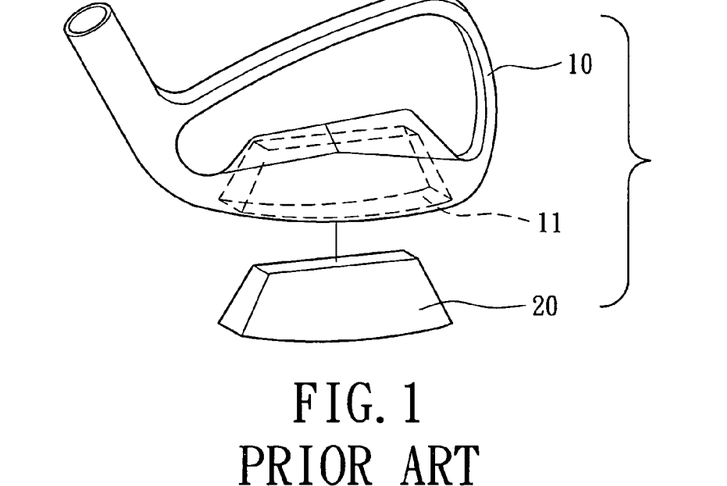
FIG. 1 is an exploded perspective view of a conventional golf club.

FIG. 1 of the drawings illustrates a conventional golf club head including a golf club head body 10 and a weight member 20. The golf club head body 10 is made of a low-density material such as a titanium alloy or Fe—Mn—Al alloy, and the weight member 20 is made of a high-density material such as a W—Fe—Ni alloy. The weight member 20 is fixed in a recession 11 of the golf club head body 10 by an appropriate means to form a golf club head product with a lower center of gravity, to increase the overall volume of the golf club head, to reduce the thickness of the golf club head, and to improve the capacity of deformation. Nevertheless, a welding process cannot be used to bond the golf club head body 10 and the weight member 20 made of different metal. Therefore, a brazing process is usually used in the golf club head industry to bond the golf club head body 10 and the weight member 20.

Figure 2:
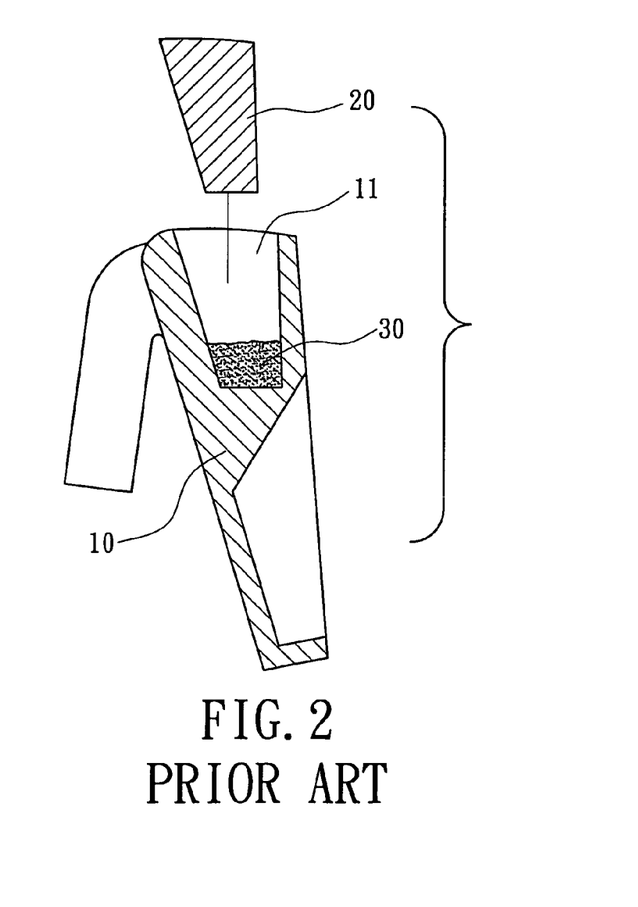
FIG. 2 is an exploded sectional view of the conventional golf club head in FIG. 1.
Figure 3:
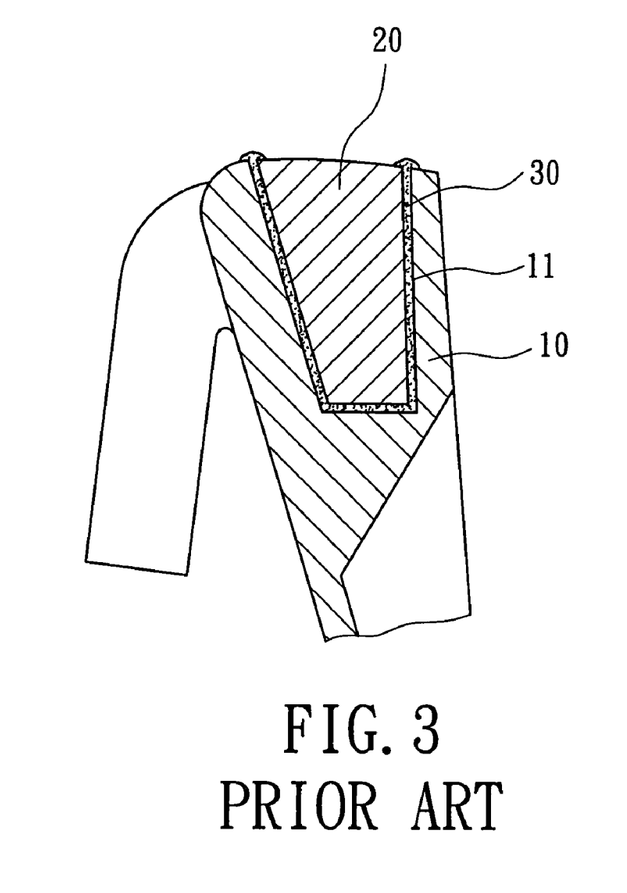
FIG. 3 is a sectional view of the conventional golf club head during brazing.
Figure 4:
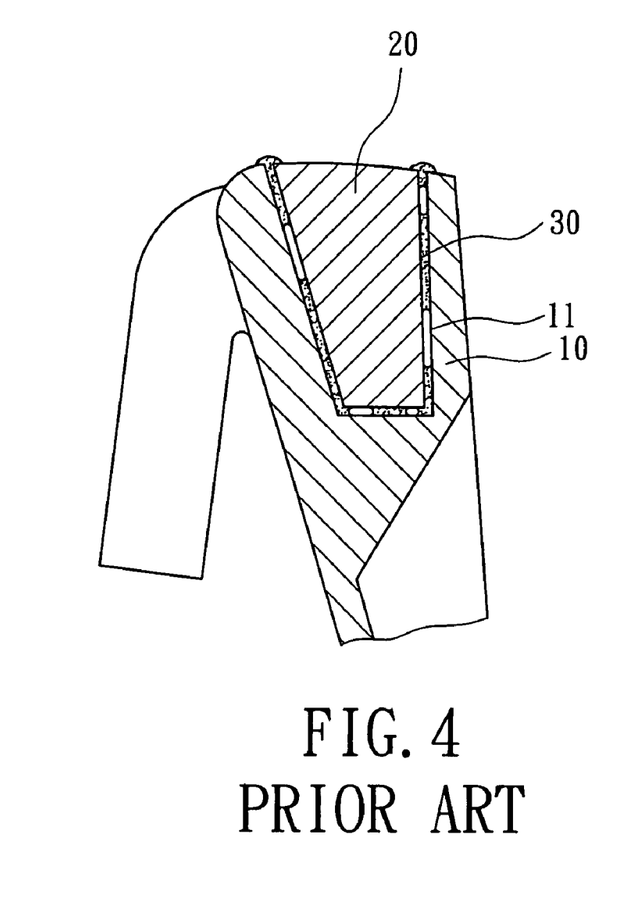
FIG. 4 is a sectional view of the conventional golf club head after brazing.

FIG. 2 is an exploded sectional view of the golf club head in FIG. 1. FIG. 3 is a sectional view of the conventional golf club head during brazing. FIG. 4 is a sectional view of the conventional golf club head after brazing. During the brazing process, solderable filler 30 with a low melting point is placed into the recession 11 of the golf club head 10 and then heated. Next, the weight member 20 is inserted into the recession 11 of the golf club head body 10. After cooling, the solderable filler 30 securely bonds the golf club head body 10 and the weight member 20 together. This brazing process is widely used, as the operation is simple. However, as illustrated in FIGS. 3 and 4, in actual operation, since the weight member 20 is inserted into the recession 11 of the golf club head body 10 after placing the solderable filler 30 into the recession 11, it is difficult for an operator to control the amount of the solderable filler 30, the engaging relationship between the recession 11 and the weight member 20, and the force required for inserting the weight member 20 into the recession 11. In particular, four sides of the weight member 20 substantially abut against a peripheral wall delimiting the recession 1 when the weight member 20 is inserted into the recession 11, yet there is no space for compression during insertion of the weight member 20. As a result, the sides of the weight member 20 cannot be completely in contact with the peripheral wall of the recession 11.

Further, if brazing paste is used as the solderable filler 30, organic materials are generated and volatilize when the brazing paste is heated, adversely affecting the brazing result. As a result, many problems occur, such as outflow of the solderable filler 30, unreliable filling of a gap between the weight member 20 and the walls delimiting the recession 11, generation of voids, and waste of solderable filler. The bonding strength for the weight member 20 is adversely affected, and the operation of the brazing process is difficult.

OBJECTS OF THE INVENTION

An object of the present invention is to provide a weight member including at least one engaging surface and at least one solder channel thereof for receiving a sufficient amount of solderable filler that can be melted and thus fill a gap between the weight member and walls delimiting a recession of a golf club head body by capillary attraction, thereby improving reliability of brazing and increasing the qualified product ratio.

Another object of the present invention is to provide a weight member including at least one engaging surface and at least one solder channel thereof for receiving solderable filler, allowing the weight member to be positioned in a recession of a golf club head body during brazing. The brazing process is simplified and the operational difficulty of brazing is reduced.

Still another object of the present invention is to provide a golf club head including a golf club head body and a weight member. The weight member includes a plurality of positioning pegs and a bottom wall of the recession of the golf club head includes a plurality of positioning holes for receiving the positioning pegs. The positioning holes and the positioning pegs are so sized that a gap is defined between the weight member and the bottom wall delimiting the recession during the brazing process, thereby improving the brazing result.

SUMMARY OF THE INVENTION

To achieve the aforementioned objects, the present invention provides a weight member includes at least one engaging surface and at least one solder channel thereof for receiving solderable filler. The weight member is inserted into a recession of a golf club head body before brazing. The solderable filler is melted and fills a gap between the weight member and the walls delimiting the recession by capillary attraction during the brazing process, thereby improving the bonding strength between the weight member and the walls delimiting the recession of the golf club head body.

The present invention also provides a golf club head including a golf club head body and a weight member. The weight member includes at least one engaging surface and at least one channel for receiving solderable filler. The weight member is inserted into a recession of the golf club head body before brazing. The solderable filler is melted and fills a gap between the weight member and the walls delimiting the recession during the brazing process, thereby improving the bonding strength between the weight member and the walls delimiting the recession of the golf club head body.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of the present invention are now to be described hereinafter in detail, in which the same reference numerals are used in the preferred embodiments for the same parts as those in the prior art to avoid redundant description.

Figure 5:
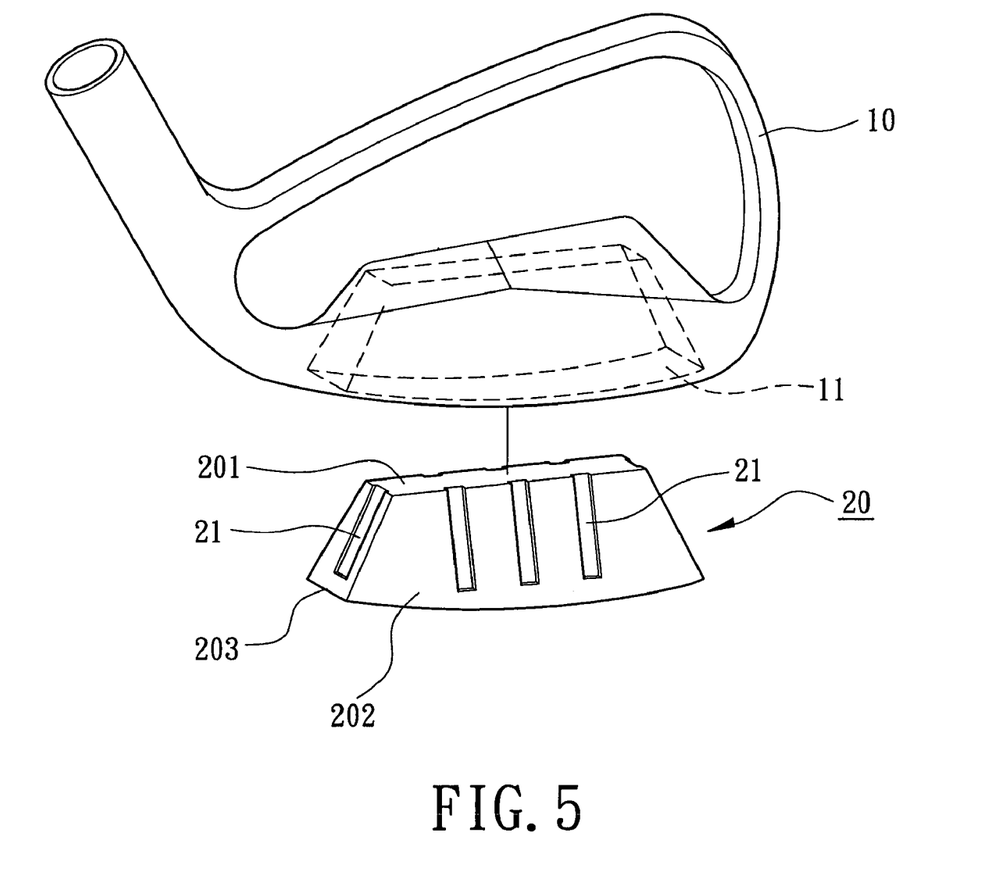
FIG. 5 is an exploded perspective view of a golf club head in accordance with a first embodiment of the present invention.
Figure 6:
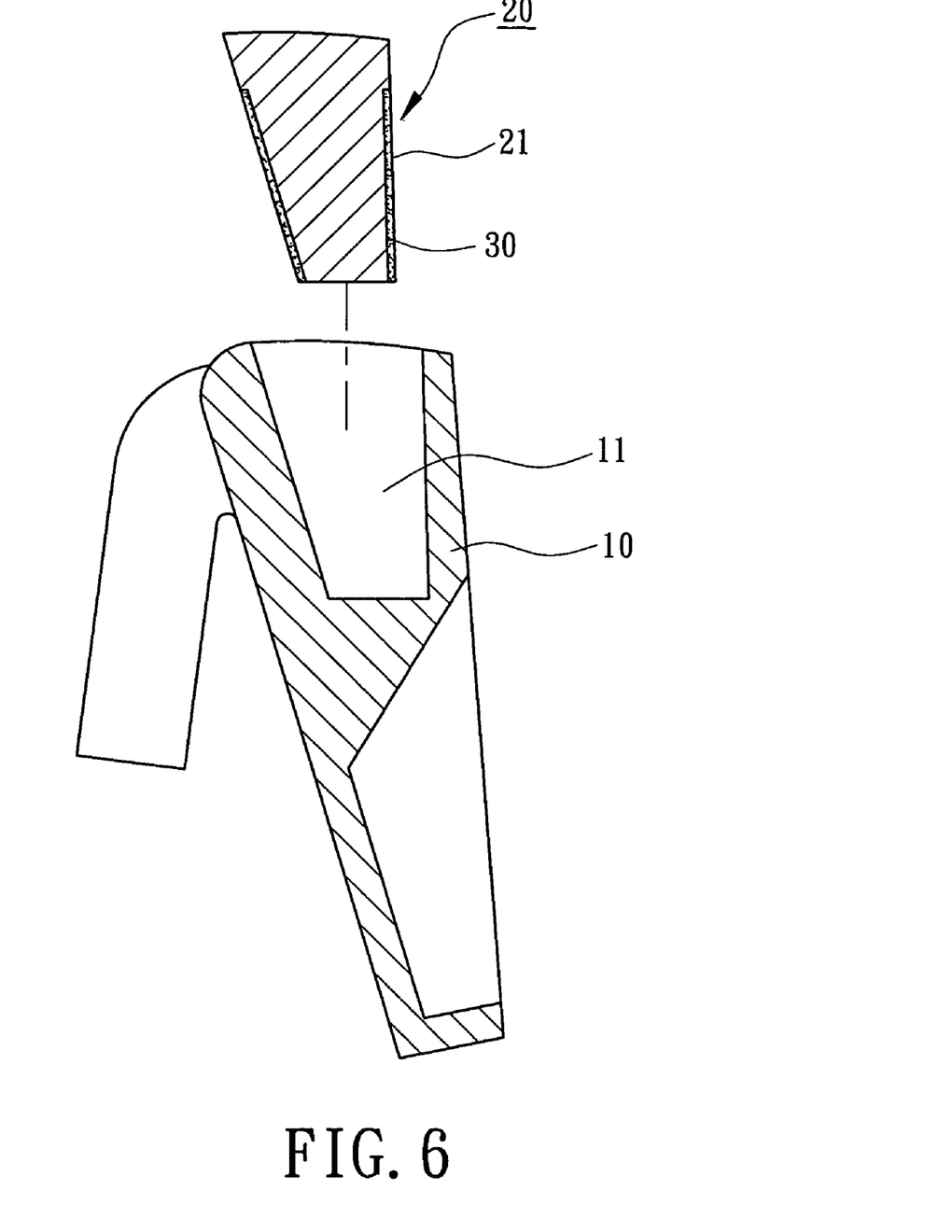
FIG. 6 is an exploded sectional view of the golf club head in accordance with the first embodiment of the present invention.
Figure 7:
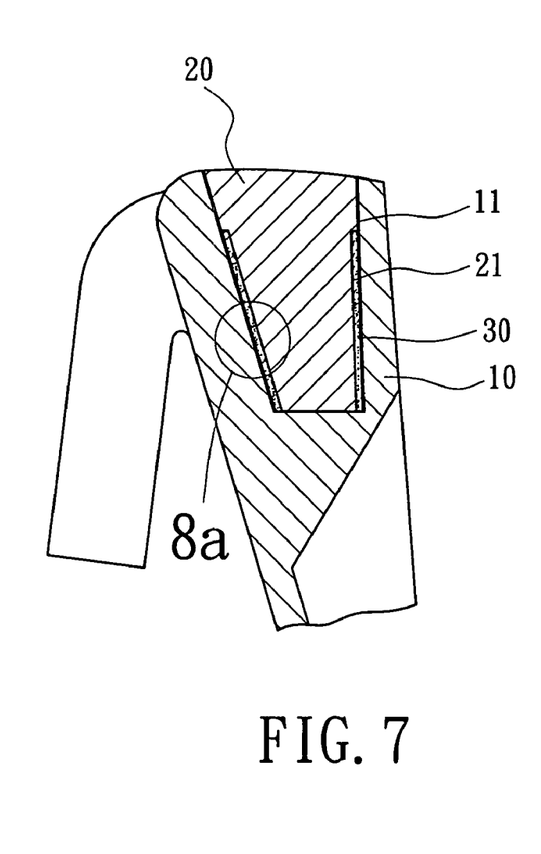
FIG. 7 is a sectional view of the golf club head in accordance with the first embodiment of the present invention during brazing.
Figure 8A:
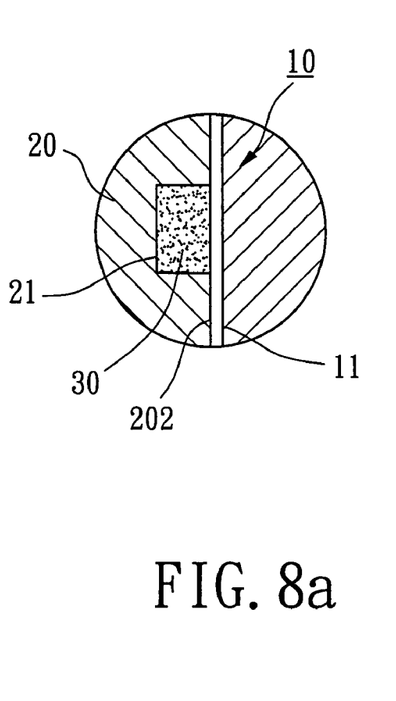
FIG. 8a is an enlarged view, in FIG. 7, across a solder channel of the golf club head in accordance with the first embodiment of the present invention.
Figure 8B:
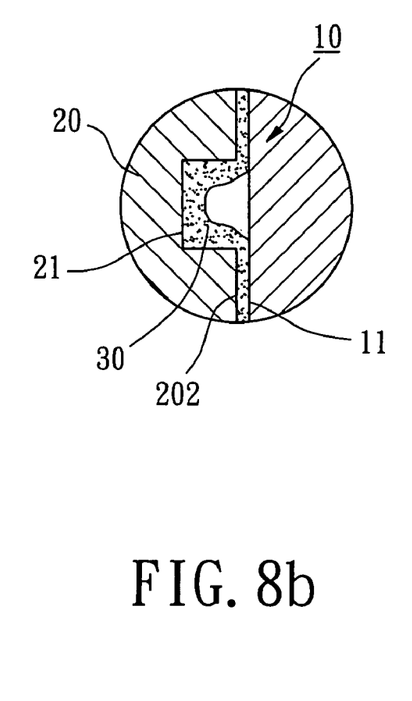
FIG. 8b is an enlarged view, similar to FIG. 8a, across the solder channel of the golf club head in accordance with the first embodiment of the present invention after brazing.

FIG. 5 is an exploded perspective view of a golf club head in accordance with a first embodiment of the present invention. FIG. 6 is an exploded sectional view of the golf club head in accordance with the first embodiment of the present invention. FIG. 7 is a sectional view of the golf club head in accordance with the first embodiment of the present invention during brazing. FIG. 8a is an enlarged view, in FIG. 7, across a solder channel of the golf club head in accordance with the first embodiment of the present invention. FIG. 8b is an enlarged view, similar to FIG. 8a, across the golf club head in accordance with the first embodiment of the present invention after brazing.

As illustrated in FIG. 5, the golf club head includes a golf club head body 10 and a weight member 20. The golf club head body 10 is an iron club made of a low-density metal such as a titanium alloy, Fe—Mn—Al alloy, stainless steel, or soft iron. The golf club head body 10 includes a recession 11 at an appropriate position, and the weight member 20 is inserted into the recession 11. The recession 11 is delimited by walls including a bottom wall (not labeled) and a plurality of side walls (not labeled). The weight member 20 is made of a high-density metal such as a W—Fe—Ni alloy. The weight member 20 includes a plurality of engaging surfaces (not labeled), a bottom face 203 and at least one solder channel 21. The weight member 20 is configured to define an appropriate number of the engaging surface—a top engaging face 201 and a plurality of engaging sides 202 for example. After the weight member 30 is inserted into the recession 11 of the golf club head body 10, the top engaging face 201 and the engaging sides 202 are in contact with inner walls of the recession 11 of the golf club head body 10. Meanwhile, the bottom face 203 of the weight member 20 is exposed and constitutes a part of an outer surface of the golf club head body 10.

Preferably, the solder channel 21 is defined in at least one of the engaging sides 202 of the weight member 20. Generally, the solder channel 22 does not extend to the bottom side 203 of the weight member 20. Preferably, the solder channel 22 has a depth ranging between 0.03 mm and 0.2 mm.

Turning to FIGS. 6, 7, 8a and 8b, a solderable filler 30 of a sufficient amount is initially filled into the solder channel 21 of the weight member 20. Subsequently, the weight member 20 is inserted into the recession 11 of the golf club head body 10 before the brazing process, as illustrated in FIG. 6. The solderable filler 30 has a melting point lower than those of the golf club head body 10 and the weight member 20. During the brazing process, as illustrated in FIG. 7, the golf club head body 10 is heated and thus melts the solderable filler 30 in the solder channel 21 of the weight member 20. The molten solderable filler 30 enters and thus fills a gap between the weight member 20 and walls delimiting the recession 11 by capillary attraction. At the same time, the solder channel 21 guide and receive the solderable filler 30, thereby expediting filling of the solderable filler 30 into the gap between the respective engaging side 202 of the weight member 20 and the walls delimiting the recession 11. As illustrated in FIGS. 8a and 8b, after brazing, the weight member 20 and the golf club head body 10 are firmly bonded by the solderable filler 30 of a sufficient amount between the respective engaging side 202 of the weight member 20 and the walls delimiting the recession 11. Even though the solderable filler 30 may be overflowed from the solder channel 21 and further spread into a gap between one of the top engaging face 201 and the engaging sides 202, and one of the bottom wall and the side walls of the recession 11. Accordingly, an empty portion of the solder channel 21 cannot affect bonding strength between the golf club head body 10 and the weight member 20. The solder channel 21 increases the bonding area and thus improve the bonding strength and bonding reliability between the weight member 20 and the golf club head body 10 and improve the qualified product ratio. The term "gap" used herein includes the solder channel 21 of the weight member 20 and a space that exists between any of the top engaging face 201 and the engaging sides 202 of the weight member 20 and any of the bottom wall and the side walls of the recession 11.

Further, when the weight member 20 is tightly engaged in the recession 11 of the golf club head body 10, since the weight member 20 includes at least one solder channel 21, the weight member 20 provides an allowance for compression while inserting the weight member 20 into the recession 11. Thus, no gap exists between the weight member 20 and the walls delimiting the recession 11 through the deformation of the weight member 20.

Preferably, the solderable filler 30 is solid material, and the overall volume of the solder channel 21 is not less than the volume of the gap between the weight member 20 and the walls delimiting the recession 11 so as to receive the solderable filler 30. For example, in a case that the solder channel 21 having a depth ranging between 0.03 mm and 0.2 mm, if an overall contact area between the weight member 20 and the golf club head body 11 is about 1000 $mm^2$, the overall volume of the solderable filler must be at least 30 $mm^3$–200 $mm^3$. In this case, at least the overall volume of the solder channel 21 ranging in 30 $mm^3$–200 $mm^3$ is sufficient.

In an alternative embodiment, the solderable filler 30 is a solder paste material contained a bonding agent. Since 50% of a volume of the solder paste material may be oxidized and volatilized when it is heated and thus melted, the amount of the solder paste material must be twice of that of the soliderable filler. The overall volume of the solder channel 21 will be at least 60 $mm^3$–400 $mm^3$.

Since the gap between the golf club head body 10 and the weight member 20 varies in response to changes in the product and/or the manufacturing process, an excess of the solderable filler 30 may remain in the solder channel 21 after filling the gap by capillary attraction. Thus, the product weight can be precisely controlled while avoiding erroneous manufacture and avoiding difficult control of the amount of the solderable filler 30.

Further, since the brazing process is performed after the weight member 20 is inserted into the recession 11 of the golf club head body 10, the operational convenience is improved and the procedure is simplified in comparison with the conventional brazing process in which the filling material is added into the recession 11 before inserting the weight member 20 into the golf club head body 10.

Figure 9:
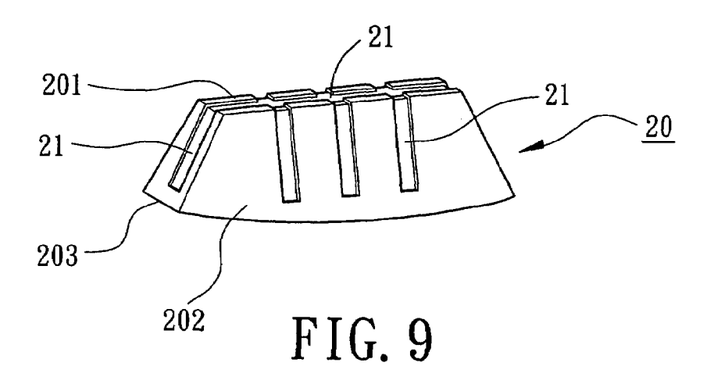
FIG. 9 is a perspective view of the weight member of the golf club head in accordance with a second embodiment of the present invention.

FIG. 9 is a perspective view illustrating a second embodiment of the weight member of the golf club head in accordance with the present invention. In this embodiment, the solder channel 21 of the weight member 20 extends to the top engaging face 201. Thus, the solder channel 21 of the weight member 20 may receive more solderable filler 30, and thereby the molten solderable filler 30 may easily flow to the engaging face 201 of the weight member 20.

Figure 10:
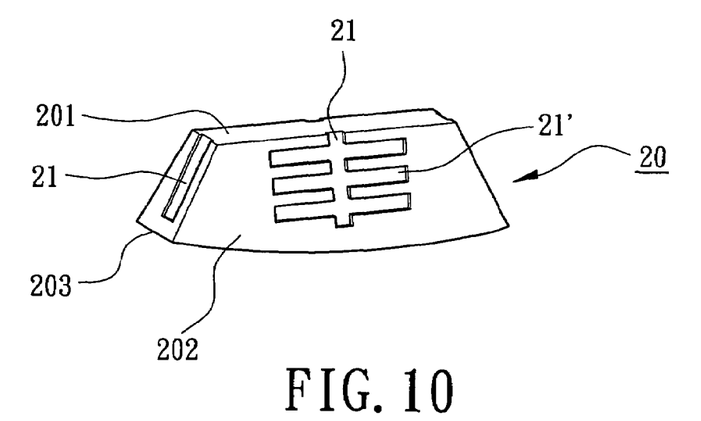
FIG. 10 is a perspective view of the weight member of the golf club head in accordance with a third embodiment of the present invention.

FIG. 10 is a perspective view illustrating a third embodiment of the weight member of the golf club head in accordance with the present invention. In this embodiment, the weight member 20 includes at least one solder channel 21 on the engaging sides 202 and at least one extension channel 21' extending in a direction transverse to the solder channel 21. Thus, the solder channel 21 and the extension channels 21' receive more solderable filler 30. The bonding area between the weight member 20 and the walls delimiting the recession 11 is increased accordingly.

Figure 11:
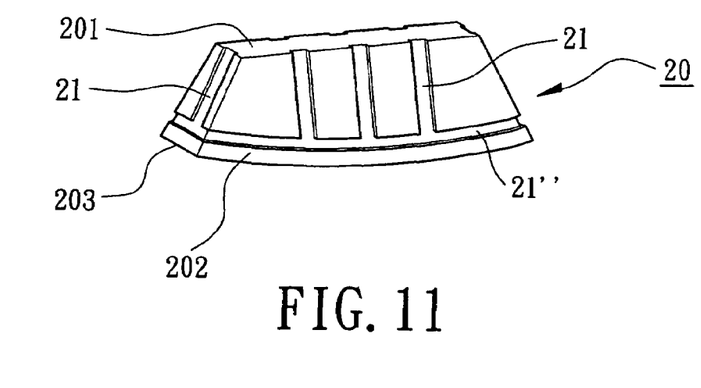
FIG. 11 is a perspective view of the weight member of the golf club head in accordance with a fourth embodiment of the present invention.

FIG. 11 is a perspective view illustrating a fourth embodiment of the weight member of the golf club head in accordance with the present invention. In this embodiment, the weight member 20 includes at least one annular channel 21" on the engaging sides 202 proximate its bottom portion. The annular channel 21" communicates with all of the solder channels 21 of the engaging sides 202. Thus, the solder channel 21 and the annular channel 21" receive more solderable filler 30. The bonding area between the weight member 20 and the walls delimiting the recession 11 is increased accordingly.

Figure 12:
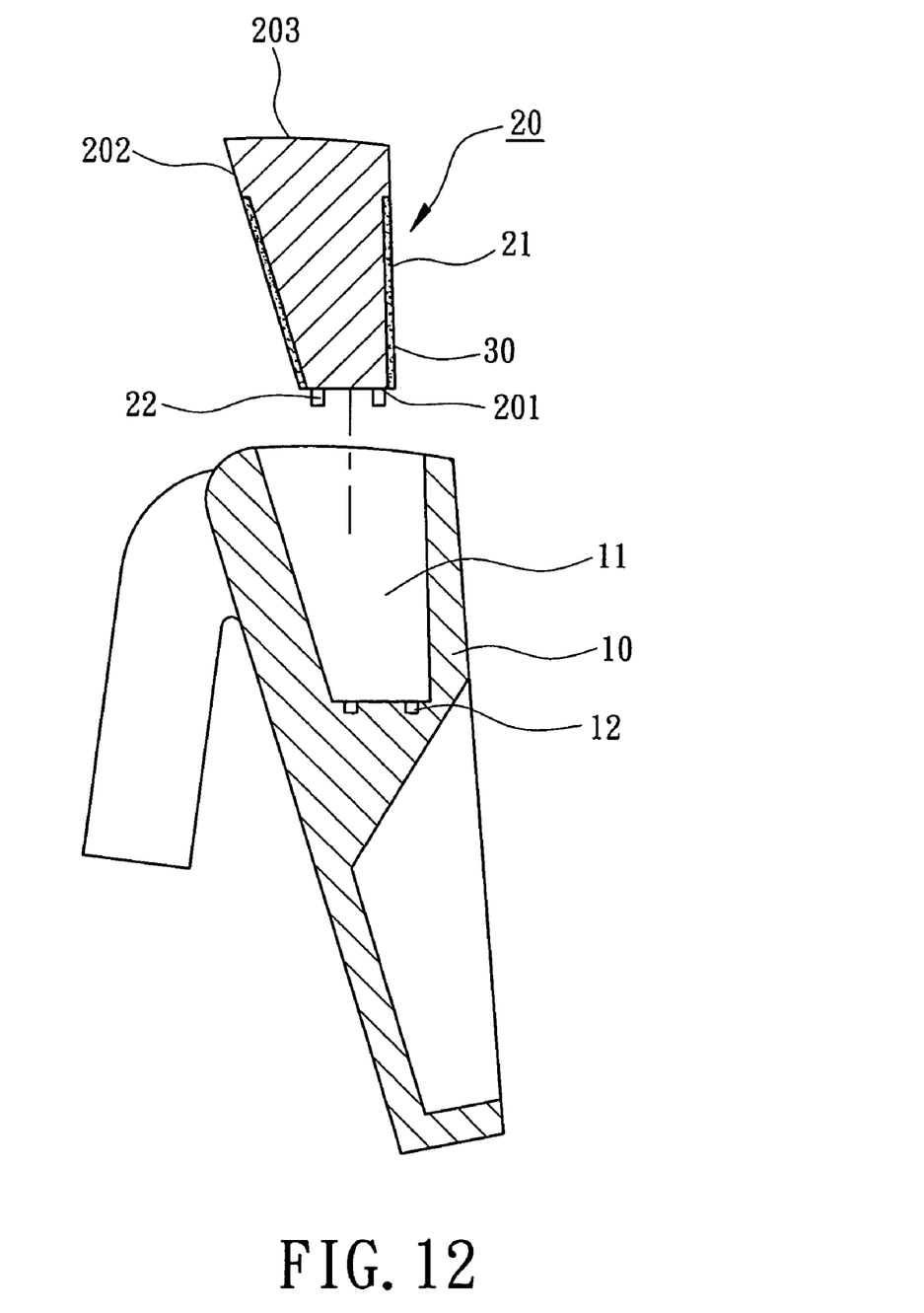
FIG. 12 is an exploded sectional view of the golf club head in accordance with a fifth embodiment of the present invention.
Figure 13:
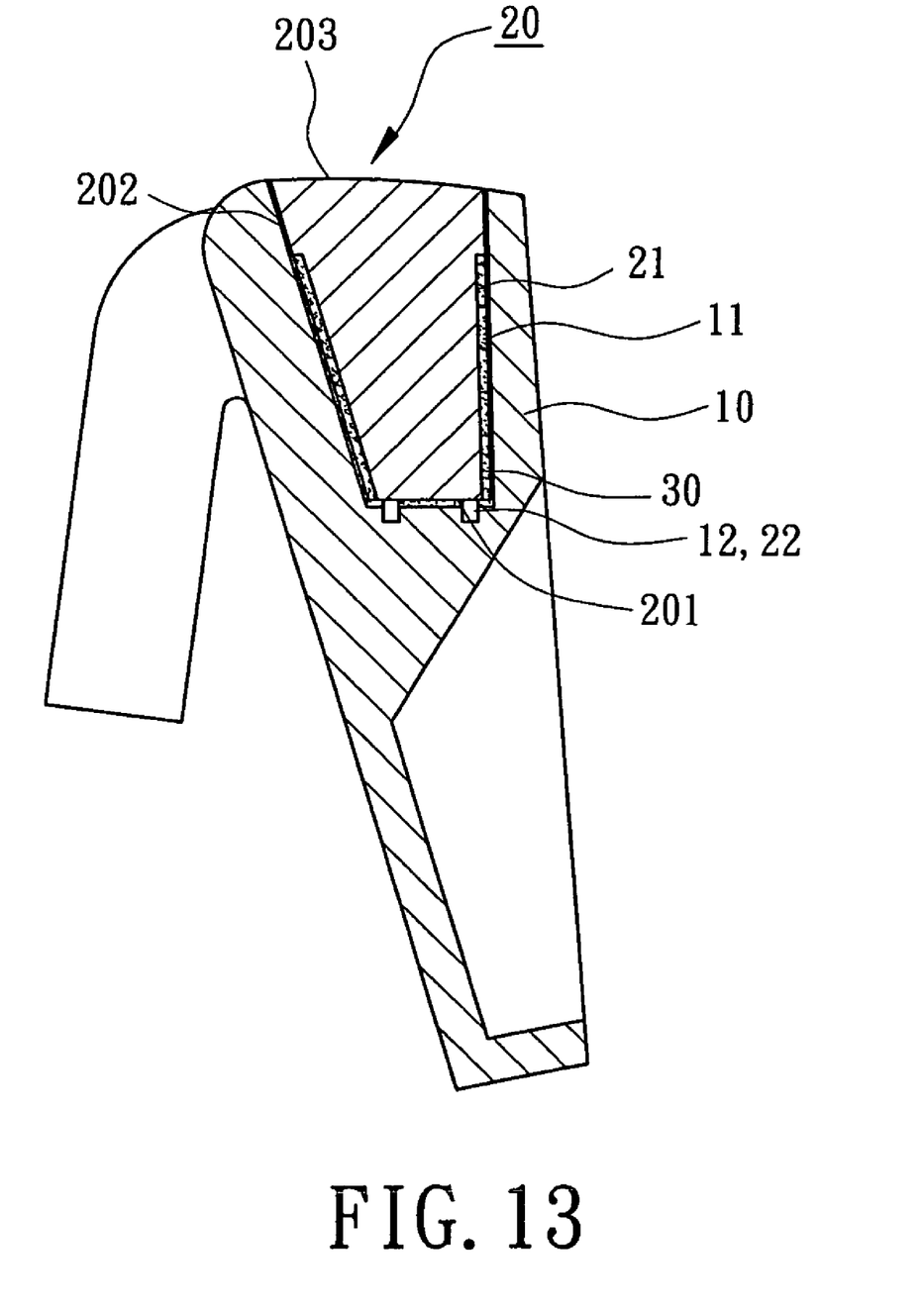
FIG. 13 is a sectional view, in FIG. 12, of the golf club head in accordance with the fifth embodiment of the present invention.

FIG. 12 is an exploded sectional view illustrating a fifth embodiment of the golf club head in accordance with the present invention. FIG. 13 is a sectional view, in FIG. 12, of the fifth embodiment of the golf club head. In this embodiment, the bottom wall delimiting the recession 11 of the golf club head body 10 includes a plurality of positioning holes 12, and the top engaging face 201 of the weight member 20 includes a plurality of positioning pegs 22 each having a length greater than that of the respective positioning hole 12. Thus, when the weight member 20 is inserted into the recession 11, with the respective positioning peg 22 being engaged in the respective positioning hole 12, a space or gap exists between the bottom wall delimiting the recession 11 of the golf club head body 10 and the top engaging face 201 of the weight member 20, as shown in FIG. 13. This assures molten solderable filler 30 to flow into the gap between the side walls delimiting the recession 11 of the golf club head body 10 and the engaging sides 202 of the weight member 20. As a result, the weight member 20 is positioned and thus improves the brazing result.

Figure 14:
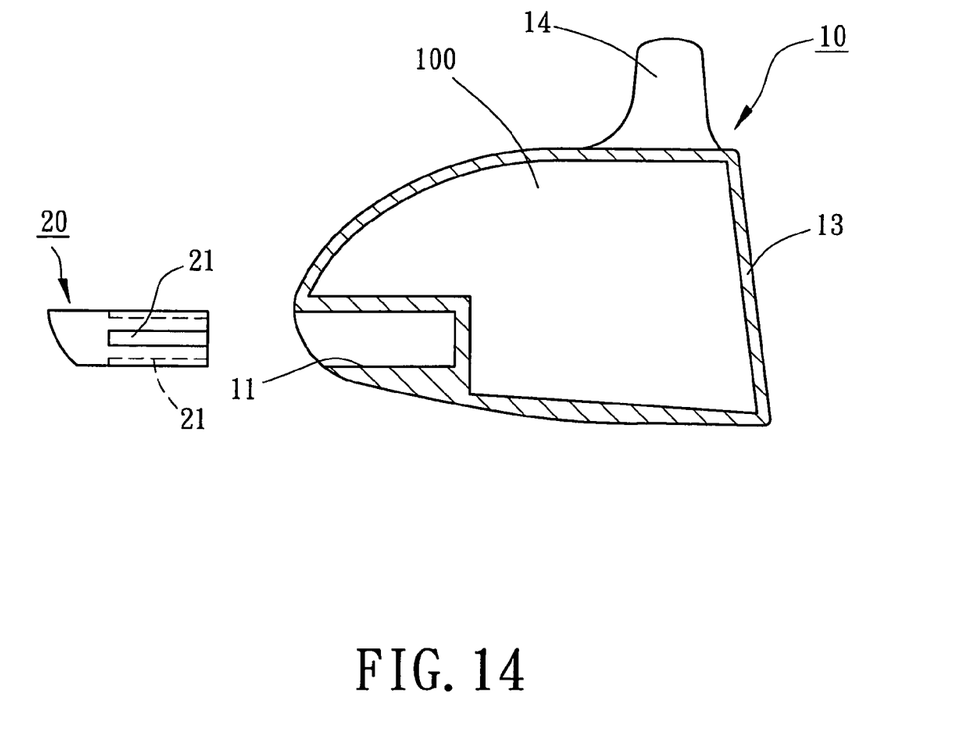
FIG. 14 is an exploded sectional view of the golf club head in accordance with a sixth embodiment of the present invention.

FIG. 14 is an exploded sectional view illustrating a sixth embodiment of the golf club head in accordance with the present invention. In this embodiment, the golf club head body 10 is a wood club including a recession 11, a striking plate 13, a hosel 14 and an inner space 100. The recession 11 is formed on a rear portion of the golf club head body 10 proximate a sole plate (not shown), and adapted to receive a weigh member 20. The striking plate 13 connects to a front portion of the golf club head body 10 for striking a golf ball. The hosel 14 connects to an end of a shaft (not shown). The weight member 20 includes at least one solder channel 21 for receiving more solderable filler 30. The bonding area between the weight member 20 and the walls delimiting the recession 11 is increased accordingly.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A golf club head comprising:
a golf club head body including a recession; and
a weight member mounted in the recession of the golf club head body, the weight member comprising at least one solder channel for receiving solderable filler, the weight member being mounted in the recession of the golf club head body before a brazing process for bonding the weight member with the golf club head body, the solderable filler being melted and filling a gap between the weight member and a plurality of walls delimiting the recession of the golf club head body during the brazing process to thereby increasing bonding strength between the weight member and the walls of the recession of the golf club head body.

2. The golf club head as claimed in claim 1, wherein said weight member consists of plurality of engaging sides, said solder channel is provided on one of said engaging sides.

3. The golf club head as claimed in claim 1, wherein said at least one solder channel has a depth ranging between 0.03 mm and 0.2 mm.

4. The golf club head as claimed in claim 2, wherein said weight member includes a top engaging face, said at least one solder channel extending from one of the engaging sides to the top engaging face of the weight member, thereby allowing the molten solderable filler to flow to the engaging face of the weight member.

5. The golf club bead as claimed in claim 2, wherein said weight member includes at least one extension channel defined on one of the engaging sides to communicate with said at least one solder channel, and said at least one extension channel extending in a direction transverse to said at least one solder channel of the weight member.

6. The golf club head as claimed in claim 2, wherein said weight member includes at least one annular channel extending on the engaging sides of the weight member.

7. The golf club head as claimed in claim 1, wherein the recession of the golf club head body being delimited by a bottom wall and a plurality of side walls, the bottom wall including a plurality of positioning holes, the weight member including a plurality of positioning pegs respectively received in the positioning holes in a manner, that the bottom wall delimiting the recession of die golf club head body is spaced from the weight member.

8. The golf club head as claimed in claim 1, wherein the solderable filer is solid material.

9. The golf club head us claimed in claim 1, wherein an overall volume of said at least one solder channel of the weight member is not less than that of the gap between the weight member and the walls delimiting the recession of the golf club head body.

10. The golf club head as claimed in claim 1, wherein the solderable filler is a solder paste material.

11. The golf club head as claimed in claim 1, wherein an overall volume of said at least one solder channel of the weight member is twice as large as that of the gap between the weight member and the walls delimiting the recession of the golf club head body.

12. The golf club head as claimed in claim 1, wherein the golf club bead body is an iron club.

13. The golf club head as claimed in claim 1, wherein the golf club head body is a wood club.

* * * * *